(12) United States Patent
Ravikanti et al.

(10) Patent No.: US 12,127,301 B2
(45) Date of Patent: Oct. 22, 2024

(54) SMART DATA SUBSCRIBER IDENTITY MODULE (SIM) PREFERENCE SELECTION AT A DUAL SIM MOBILE DEVICE

(71) Applicant: QUALCOMM Incorporated, San Diego, CA (US)

(72) Inventors: Vinay Kumar Ravikanti, Hyderabad (IN); Rashed Mohammed, Hyderabad (IN); Manohar Yarlagadda, Hyderabad (IN); Krithi Aiyappa, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 17/531,613

(22) Filed: Nov. 19, 2021

(65) Prior Publication Data

US 2023/0164541 A1 May 25, 2023

(51) Int. Cl.
*H04W 8/20* (2009.01)
*H04M 3/38* (2006.01)
*H04W 8/18* (2009.01)

(52) U.S. Cl.
CPC ............ *H04W 8/20* (2013.01); *H04W 8/183* (2013.01)

(58) Field of Classification Search
CPC ......... H04W 8/20; H04W 8/183; H04W 4/60; H04W 4/02; H04W 48/18; H04W 88/02; H04M 3/387; H04M 12/40; H04M 15/751; H04M 15/7556; H04M 17/103
See application file for complete search history.

(56) References Cited

U.S. PATENT DOCUMENTS

| | | | |
|---|---|---|---|
| 9,066,330 B2 | 6/2015 | Hang et al. | |
| 10,187,781 B2 * | 1/2019 | Kumar | H04W 76/36 |
| 10,716,019 B1 * | 7/2020 | Velusamy | H04W 24/06 |
| 11,012,850 B1 | 5/2021 | Zhu | |
| 11,109,205 B2 * | 8/2021 | Zhao | H04W 48/18 |
| 11,228,998 B1 * | 1/2022 | Gupta | H04W 8/18 |
| 2014/0273974 A1 * | 9/2014 | Varghese | H04W 88/06 455/552.1 |
| 2015/0365816 A1 * | 12/2015 | Timonen | H04L 12/1435 455/558 |
| 2015/0382178 A1 * | 12/2015 | Park | H04W 8/183 455/411 |
| 2016/0080933 A1 | 3/2016 | Sarkhel et al. | |
| 2016/0149605 A1 | 5/2016 | Vecera et al. | |

(Continued)

FOREIGN PATENT DOCUMENTS

| | | |
|---|---|---|
| EP | 3780676 A1 | 2/2021 |
| WO | 2015047834 | 4/2015 |

OTHER PUBLICATIONS

International Search Report and Written Opinion—PCT/US2022/078223—ISA/EPO—Feb. 7, 2023.

*Primary Examiner* — Andrew Wendell
(74) *Attorney, Agent, or Firm* — Patterson+ Sheridan, L.L.P.

(57) ABSTRACT

Certain aspects of the present disclosure provide techniques for wireless communications by a multi-subscriber identity module (multi-SIM) user equipment (UE), comprising: receiving a set of preconfigured user preferences, based on, at least in part, the set of preconfigured user preferences, dynamically selecting to communicate data using one of a first SIM or a second SIM of the multi-SIM UE, and receiving data transfer using the selected first SIM or second SIM.

30 Claims, 7 Drawing Sheets

(56) References Cited

U.S. PATENT DOCUMENTS

| | | | |
|---|---|---|---|
| 2016/0219421 A1* | 7/2016 | Shi | H04M 3/42042 |
| 2017/0048855 A1* | 2/2017 | Garg | H04W 48/16 |
| 2017/0164277 A1 | 6/2017 | Anyuru | |
| 2018/0042054 A1* | 2/2018 | Han | H04W 74/0841 |
| 2022/0038979 A1* | 2/2022 | Bongaarts | H04W 36/30 |
| 2022/0164830 A1* | 5/2022 | Kang | H04W 4/022 |
| 2022/0386103 A1* | 12/2022 | Chughtai | H04W 8/183 |
| 2023/0189212 A1* | 6/2023 | Chen | H04W 68/12 |
| | | | 455/458 |
| 2023/0396986 A1* | 12/2023 | Nuggehalli | H04W 76/15 |

\* cited by examiner

600

```
A METHOD FOR WIRELESS COMMUNICATIONS BY A MULTI-
SUBSCRIBER IDENTITY MODULE (MULTI-SIM) USER EQUIPMENT
(UE), COMPRISING
```

610

RECEIVING A SET OF PRECONFIGURED USER PREFERENCES

620

BASED, AT LEAST IN PART, ON THE SET OF PRECONFIGURED USER PREFERENCES, DYNAMICALLY SELECTING TO COMMUNICATE DATA USING ONE OF A FIRST SIM OR A SECOND SIM OF THE MULTI-SIM UE

630

RECEIVING A DATA TRANSFER USING THE SELECTED FIRST SIM OR SECOND SIM

*FIG. 6*

SMART DATA SUBSCRIBER IDENTITY MODULE (SIM) PREFERENCE SELECTION AT A DUAL SIM MOBILE DEVICE

INTRODUCTION

Aspects of the present disclosure relate to wireless communications, and more particularly, to techniques for dynamically selecting a subscriber identity module (SIM) for data transfer.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect includes a method for wireless communications by a multi-subscriber identity module (multi-SIM) user equipment (UE). The method may include receiving a set of preconfigured user preferences. The method may include, based on, at least in part, the set of preconfigured user preferences, dynamically selecting to communicate data using one of a first SIM or a second SIM of the multi-SIM UE. The method may include receiving a data transfer using the selected first SIM or second SIM.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 6 illustrates example operations for wireless communications by a user equipment (UE), in accordance with some aspects of the present disclosure.

DETAILED DESCRIPTION

Aspects of the present disclosure provide apparatuses, methods, processing systems, and computer-readable mediums for dynamically selecting a subscriber identity module (SIM) for data transfer.

Currently, SIM preference is static and does not change based on hours of the day or instantaneous location of a user equipment (UE). A user of a multi-SIM (MSIM or multi-SIM) device must manually toggle between SIMs in a multi-SIM UE to specify a SIM preference for receiving data. If a user fails to change the SIM preference to meet his data usage needs, or if a user is unable to identify a circumstance where toggling between SIMs would properly meet his data usage needs, then his data would be unnecessarily consumed contrary to his needs. Advantageously, in accordance with aspects of the present disclosure, a multi-SIM UE selects a SIM for data usage independent of active user toggling.

In certain aspects of the present disclosure a multi-SIM UE may select a SIM preference to enable data usage on a specific SIM, for the purpose of enabling data usage for personal or business use. To perform this function automatically, the UE may determine whether data usage corresponds to a certain purpose, for example, historical user information, application classification schemes, and user location information. A UE may also avoid the truncation of data services during a dual-sim dual standby (DSDS) multi-SIM UE voice call by automatically selecting SIM preferences to enable data on the SIM receiving the voice call.

By automatically selecting SIM preferences, a UE may enable data usage segregation based on certain use cases, reduce data usage during non-active hours of the day, save power because of reduced data activity.

Introduction to Wireless Communication Networks

Figure 1:
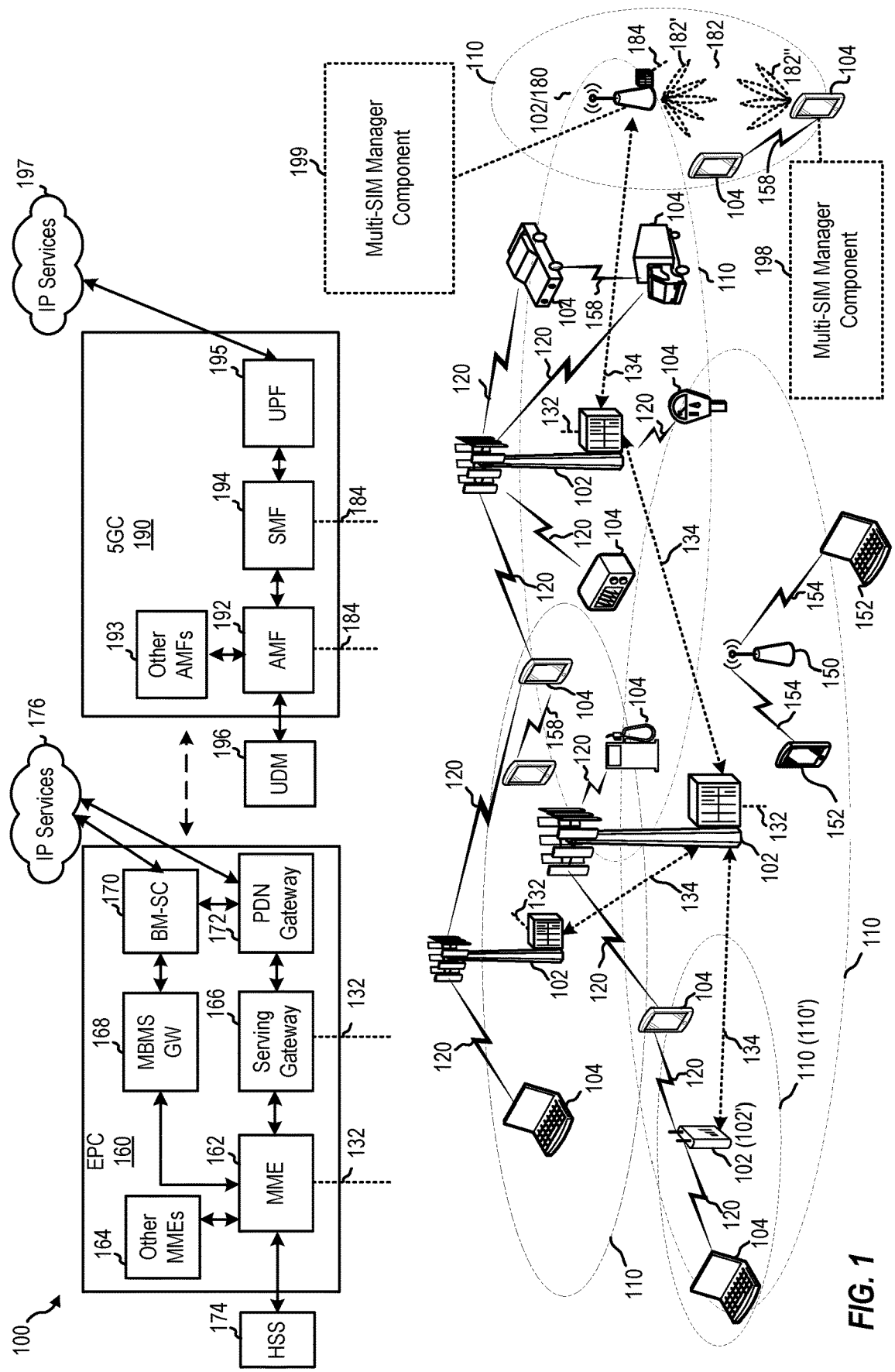
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes a multi-subscriber identity module (multi-SIM, MSIM) manager component 199, which may be configured to transmit to a selected SIM receiving data transfer. Wireless network 100 further includes a multi-SIM manager component 198, which may be configured to select a SIM to receive data transfer.

Figure 2:
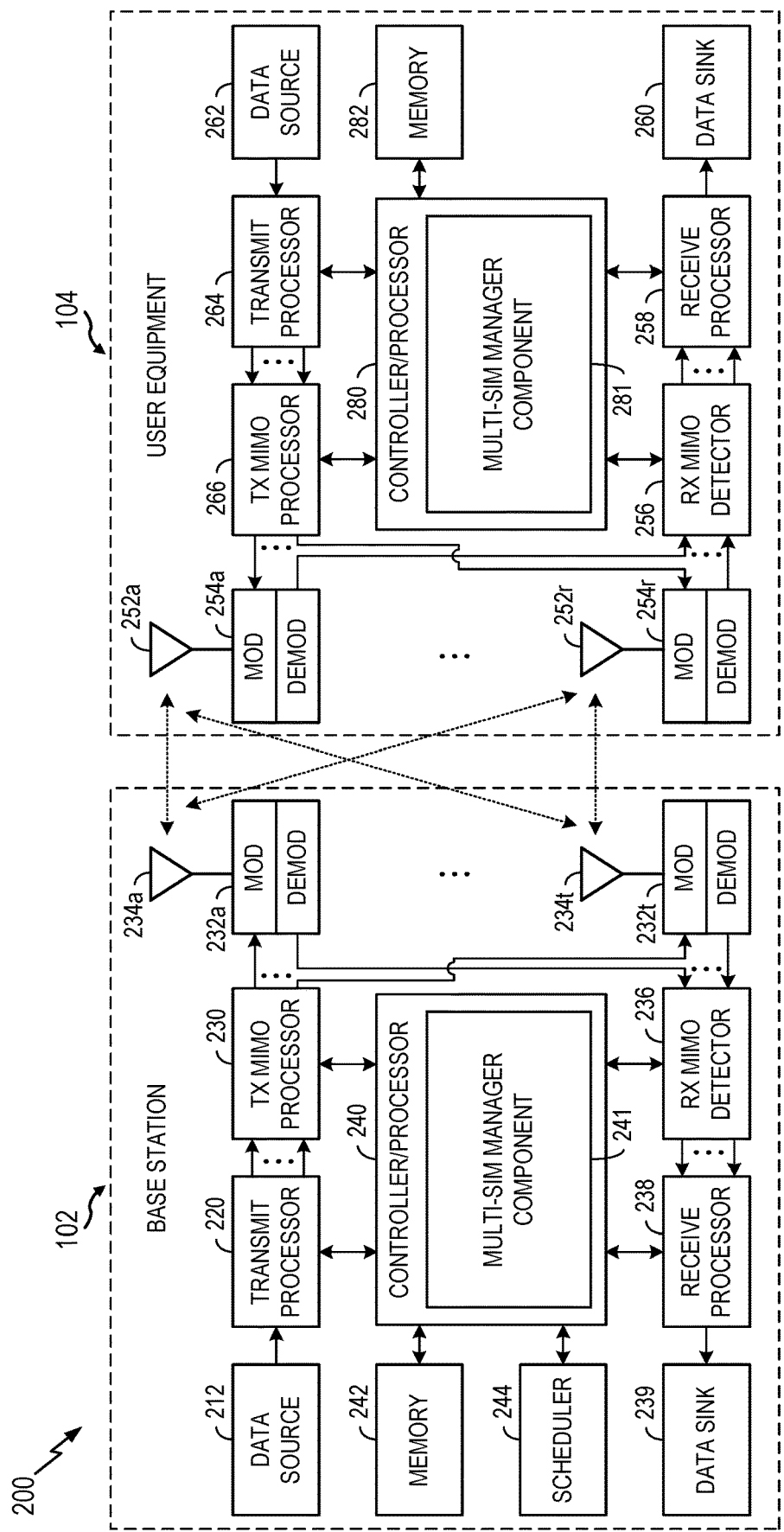
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a multi-SIM manager component 241, which may be representative of a multi-SIM manager component 199 of FIG. 1. Notably, while depicted as an aspect of controller/processor 240, a multi-SIM manager component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes a multi-SIM manager component 281, which may be representative of a multi-SIM manager component 198 of FIG. 1. Notably, while depicted as an aspect of controller/processor 280, a multi-SIM manager component 281 may be implemented additionally or alternatively in various other aspects of user equipment 104 in other implementations.

Further discussions regarding FIG. 1 and FIG. 2 are provided later in this disclosure.

Example Multi-SIM Operation

Figure 3:
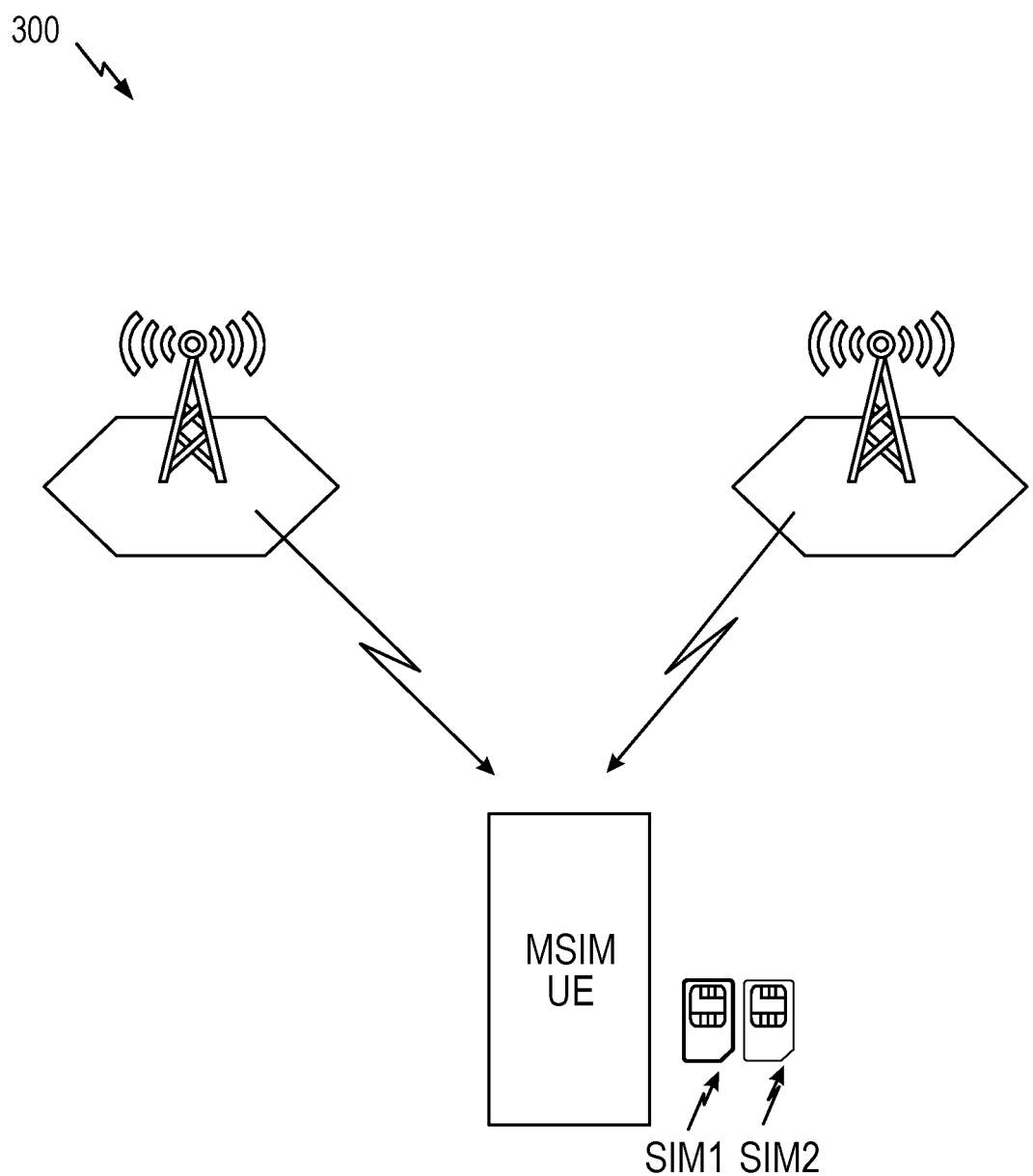
FIG. 3 illustrates an example multi-SIM deployment for a UE, in accordance with certain aspects of the present disclosure.

FIG. 3 illustrates an example multi-SIM deployment, in which a UE supports multiple SIMS (SIM1 and SIM2), which may support the same or different radio access technologies (RATs). At any given time, the multiple SIMs may concurrently be in an idle state and may support different modes of operation. For example, a UE with a single receiver may support a Single Receive Dual SIM Dual Standby (SR-DSDS) mode, where only one RAT is receiving at a time. In a Dual Receive (DR)-DSDS mode, the multi-SIM UE may simultaneously receive using multiple RATs at a given time.

NR concurrent radio-access technology (RAT) operation generally refers to operating multiple simultaneous active connections with at least one connection being on NR. For example, the two connections may involve LTE and NR connections, or both NR connections. Multi-SIM devices are able to connect to multiple networks independently without network awareness. Different UE behaviors may occur based on different implementations such as, for example, dual-SIM dual active (DSDA) or dual-SIM dual standby (DSDS).

DSDS generally refers to a dual-SIM deployment where the two SIM cards of the UE may be unable to simultaneously generate traffic. DSDS devices may be configured with two different network subscriptions (one for each SIM) only one of those subscriptions needs to support a data connection. Unlike voice services that have a specific phone number associated with each subscription, having data services on one subscription is often sufficient to provide all the data services needed by the user independent of the other subscription. With this configuration, a DSDS device may have one network subscription for both data and voice services and the other subscription intended for only providing voice communications. DSDA on the other hand refers to a dual-SIM deployment where both SIM cards of the UE may be active at the same time. With this configuration, a DSDA device may have two network subscriptions for both data and voice services. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM receivers allow the different SIMs to support a variety of different combination options. For example, dual-SIM (DSIM) devices could support the following:

SA-NR+SA-NR: both SIMs could support standalone (SA) NR (SA-NR);
NSA-NR+LTE: one SIM supports non-standalone (NSA) while another SIM supports LTE;
LTE+LTE: both SIMs support LTE;
LTE+W: one SIM supports LTE, the other supports wideband CDMA; or any other combination (X RAT+X RAT both SIMs the same RAT or X RAT+Y RAT the SIMs support different RATs).

In some cases, in a multi-SIM deployment, each SIM of the UE can belong to the same network carrier. For example, two or more SIMs (also referred to herein as subscribers or SUBs) belonging to the same operator can be in the following modes:

(1) Idle+Idle: 2 or more SUBs in Idle camp to the same cell
(2) Connected+Idle: 1 SUB in Idle and 1 Sub Connected camp to the same cell In conventional multi-SIM deployments, in scenarios where the UE is performing a low priority activity via a first SIM and a high priority activity is triggered on the same or different SIM of the UE, the high priority activity may be delayed, significantly impacting the performance of the UE. For example, assume an out of service indication is triggered on a SIM while another (or same) SIM is performing Closed Subscriber Group (CSG) autonomous search function. In this example, the recovery from the out of service may be delayed due to the CSG autonomous search, which may involve performing measurements for multiple CSG cells, performing a full band scan to obtain a given CSG cell, etc. These measurements and band scans may utilize RF resources of the UE, causing tune-aways and increasing the delay time for out of service recovery on the SIM in which the out of service indication is triggered on.

In some examples, in scenarios where a packet switch (PS) call/throughput is triggered on a SIM while another (or same) SIM is performing CSG autonomous search function, the triggered SIM may experience throughput degradation due to the CSG autonomous search function. In some examples, in scenarios where a SIM is not running throughput but the network sends measurement to the SIM for NR addition while another (or same) SIM is performing CSG autonomous search function, there may be a delay in NR measurements, additions/deletions/configurations, etc., in the triggered SIM, due to tune-aways triggered from the CSG autonomous search function. In some examples, in scenarios where a network is running a timer for a given NR configuration on a SIM and there is a delay on that configuration, the network may delete NR object(s) and deactivate NR from that SIM.

In the current state of the art, a SIM preference is static and does not change based on hours of the day or instantaneous location of a UE. A multi-SIM user must manually toggle between SIMs in a multi-SIM UE to specify a SIM preference for receiving data. If a user fails to change the SIM preference to meet his data usage needs, or if a user is unable to identify a circumstance where toggling between SIMs would properly meet his data usage needs, then his data would get consumed contrary to his needs. For example, where a user has set his SIM preferences on a multi-SIM UE to receive data on a business SIM, but receives data for personal use on the business SIM, the UE will use business SIM data for improper personal use. Likewise, where a user has set his SIM preferences on a multi-SIM UE to receive data on a personal SIM, but receives data for business use on the personal SIM, the UE will use personal SIM data for improper business use. Manual SIM preference selection may also be inadequate to restrict the background data usage dynamically during non-business hours and at night, when data may not be needed.

Additionally, static, user-determined SIM preferences may end data functionality entirely where a UE is enabled with DSDS capabilities Accordingly, what is needed is a solution that allows a multi-SIM UE to select a SIM for data usage independent of active user toggling.

Aspects Related to Dynamically Selecting a SIM for Data Transfer

According to certain aspects of the present disclosure, a multi-SIM UE may select which SIM card to enable for data independent of active user selection. In an example, a MSIM may determine a SIM preference for communicating data from one or more networks. Communicating data may include transmitting data, receiving data, or transferring data. For example, a SIM preference setting may specify that only a first SIM receive data from a network under certain conditions. SIM preferences allow a user to segregate data usage by SIM for different purposes (e.g., data on SIM-1 is used for personal matters but not for business matters).

Preferences may also reduce data usage during non-active hours of the day, and save power because of the reduced usage.

According to certain aspects of the present disclosure, a user may designate a SIM for a specific use purposes. A use purpose may be, for example, a business purpose, a personal purpose, a travel purpose, etc. Use purposes are not limited to those disclosed herein.

In one case, each SIM in a multi-SIM UE has a wireless subscription. Subscriptions may be independent from one another. Each SIM may be capable of making and receiving voice calls and using network data. In many UE operating systems (e.g., iOS, Android), a multi-SIM UE can make and receive voice calls on any SIM, but data usage is restricted to a certain subset of SIMs based on a SIM preference. The SIM preference indicates which SIM to use for data. In a dual SIM (DSIM) UE, only one SIM card is configured for data usage.

In one example, a first SIM may be designated for business use, while a second SIM may be designated for personal use. A user may provide information related to each use purpose so that the UE is configured with information for dynamically selecting a SIM in real-time based on the configuration and without soliciting additional user input when a call is received. Based on the information from the user, a UE may select a SIM to enable data usage on either the first or the second SIM, for the purpose of enabling the data for personal or business use. To perform this function automatically/without any input from the user at the time of a call, the UE may differentiate the usage of SIM card data based on use purpose, where a particular SIM card will be enabled for a particular usage. A UE may determine whether data usage corresponds to a certain purpose using, for example, historical user information, preconfigured SIM preferences, application classification schemes, and/or user location information. SIM purposes may extend beyond business and personal uses (e.g., SIMs could be job-specific, region specific, time specific).

For example, a user may provide his business hours to the UE prior to the UE selecting a SIM preference. A user may then indicate a first SIM preferred for business use. Based on the business hours and the user indication of the first SIM for business use, the UE may select the SIM designated for business purposes during the input business hours, and may deselect the SIM designated for business purposes outside of input business hours.

Similarly, a UE may use location information to select a SIM preference. For example, a user may provide his business location to the UE prior to the UE selecting a SIM preference. A user may then indicate a first SIM is preferred for business use. The UE may select the SIM designated for business purposes when the UE detects that its current location corresponds with the user's indicated office location. The UE may deselect the SIM designated for business purposes when the UE is not at the indicated office location. In one case, a UE may select a SIM designated for business purposes when the UE is present at the business location even if the selection occurs outside of input business hours discussed above. In one example, this may occur based on a prior user indication that presence at a business location is a higher priority parameter than operation during or outside of business hours. In another case, a UE may deselect a SIM designated for business purposes when the UE is present at the business location based on other information, like if the UE detects that that the user is on holiday. In one example, this may occur based on a prior user indication that a holiday calendar is a higher priority parameter than operation at a business location.

A UE may also select SIM preference based on a classification scheme for applications that use data. For example, a user may install both business applications (e.g., work email, video conferencing, etc.) and personal applications (e.g., social media applications) on a multi-SIM UE. Application classification schemes indicate to the UE the purpose for which a certain application is used. For example, the UE may use a third-party (e.g., PlayStore) application classification scheme to determine whether data usage is for a business purpose. Additionally, a UE may use an application scheme generated from historical user preferences for application classification. Certain applications may have both business uses and personal uses (e.g., video streaming for both education and entertainment). After indicating a SIM preferred for business use and a SIM preferred for personal use, the user may be prompted to classify an app for a certain purpose. In response, the UE may use the classification to automatically select a SIM preference for any subsequent application usage.

In addition to selecting a SIM preference for data transfer, a UE may specify restricting data usage within the SIM preference. UEs tend to consume background data even when users are not actively using UE features. Currently, a UE may track its usage statistics. For example, background data usage may be restricted during sleep. If a UE is not in use and has reached a timing threshold like midnight, then a SIM preference may end data usage completely, or apply a restricted data usage policy for selected applications. As a result, the data usage may be reduced and power may be saved. In some cases, emergency data applications will be available (e.g., certain messenger applications), but other apps may be restricted.

According to certain aspects of the present disclosure, information the UE may use to select a SIM preference may be adapted for greater efficacy using a continuous machine learning algorithm. The continuous machine learning algorithm may use, for example, indications of SIM purpose, specified hours, application classification, location information, and usage restriction information. The algorithm may fine tune the boundaries of each of the above parameters as they change over time. Based on the fine-tuning, a UE may select a SIM preference and determine usage restrictions to optimize UE data usage for a given time and location.

In certain cases, a multi-SIM UE selecting SIM preferences may be a dual-SIM dual active (DSDA) device as discussed above.

In certain cases, a multi-SIM UE selecting SIM preferences may be a dual-SIM dual standby (DSDS) device as discussed above. DSDS devices may be configured with two different network subscriptions (one for each SIM) and only one of those subscriptions needs to support a data connection. DSDS devices cannot maintain a data services session (i.e., downloading or uploading data) initiated using one SIM when a voice call is received through the second SIM. Typically, the active data services session on a first SIM must be put on standby in order to activate the voice communication connection on a second SIM. When a traditional DSDS device is downloading a data file (i.e., synching an email inbox) using a second SIM and receives a voice call from the network subscription of a first SIM, the data download must be discontinued until the voice call has ended.

Figure 4:
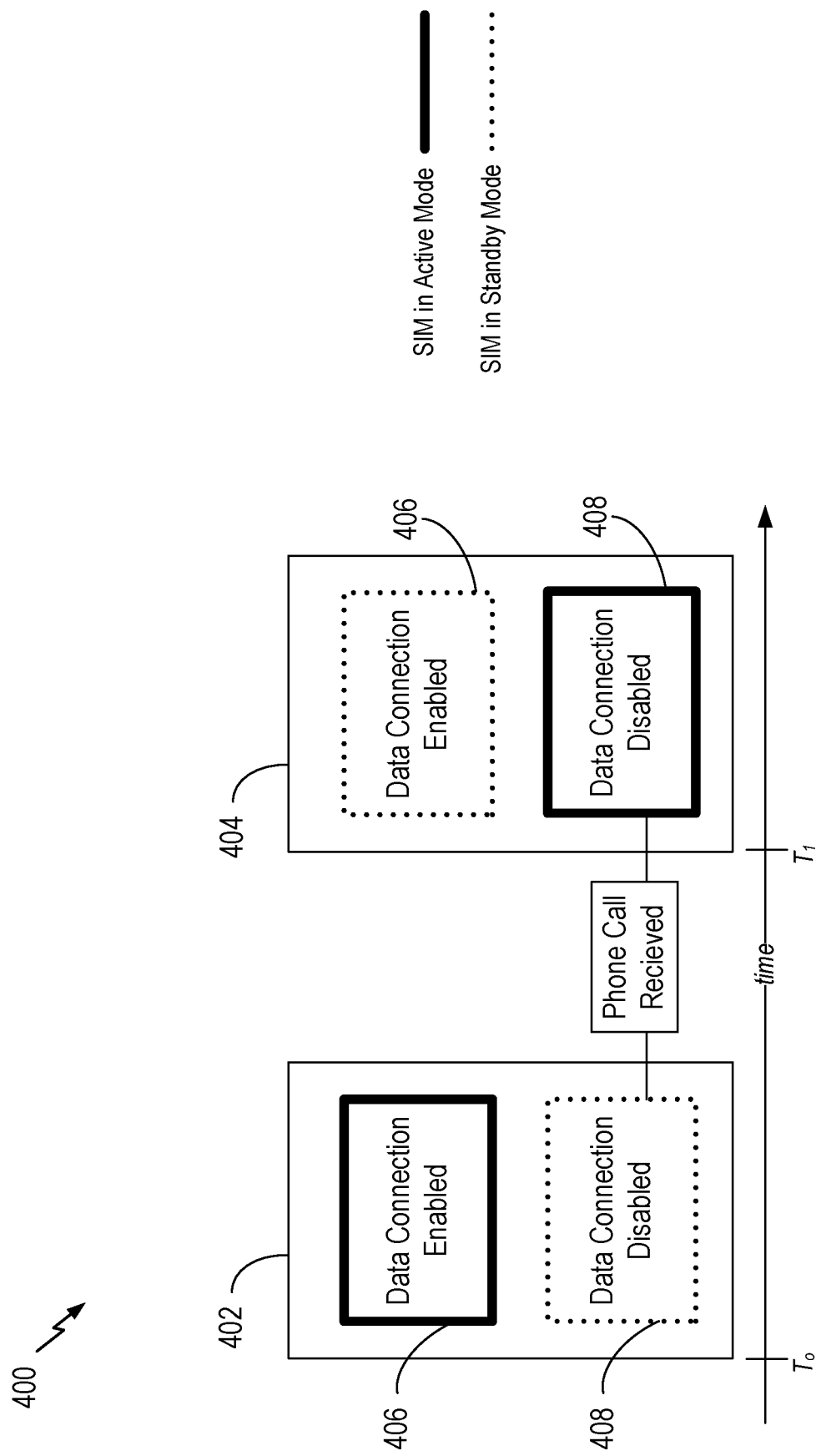
FIG. 4 depicts an example subscriber identity module (SIM) selection in a dual SIM dual active (DSDA) user equipment (UE).

As illustrated in FIG. 4, when a traditional DSDS UE is in a first state 402, the DSDS UE places a first SIM 406 in active mode and a second SIM 408 in standby mode. A user enables data connection on the active first SIM, and disables data connection on the standby second SIM, allowing the DSDS UE to use data services.

When the UE receives a voice call on the second SIM 408, and a user accepts the call at time $T_1$, the DSDS UE enters a second state 404. In the second state, the UE places the first SIM 406 in standby mode and the second SIM 408 in active mode (to take the voice call answered at $T_1$), ending the DSDS UE's data connection. The first SIM 406, which is the only SIM configured for data connection according to the user's data preferences, is placed in standby mode until the termination of the call on the second SIM allows the DSDS to reenter the first state 402. Thus, the user will not be able be to use data to browse or make Voice over Internet Protocol (VoIP) calls for the duration of the voice call on the second SIM 408.

According to certain aspects of the present disclosure, a DSDS UE may avoid the truncation of data services during a DSDS UE voice call by automatically selecting SIM preferences to enable data on the SIM receiving the voice call. For example, when a DSDS UE enters the second state 404 when a user answers a voice call as illustrated in FIG. 4, the DSDS UE may reselect SIM preferences to enable data on the second SIM 408 instead of the first SIM 406. As a result, the second SIM may be able to access data during the voice call on the second SIM, thereby not disconnecting an ongoing data session. This voice call reselection may be part of the SIM preference selection procedures discussed above.

Figure 5:
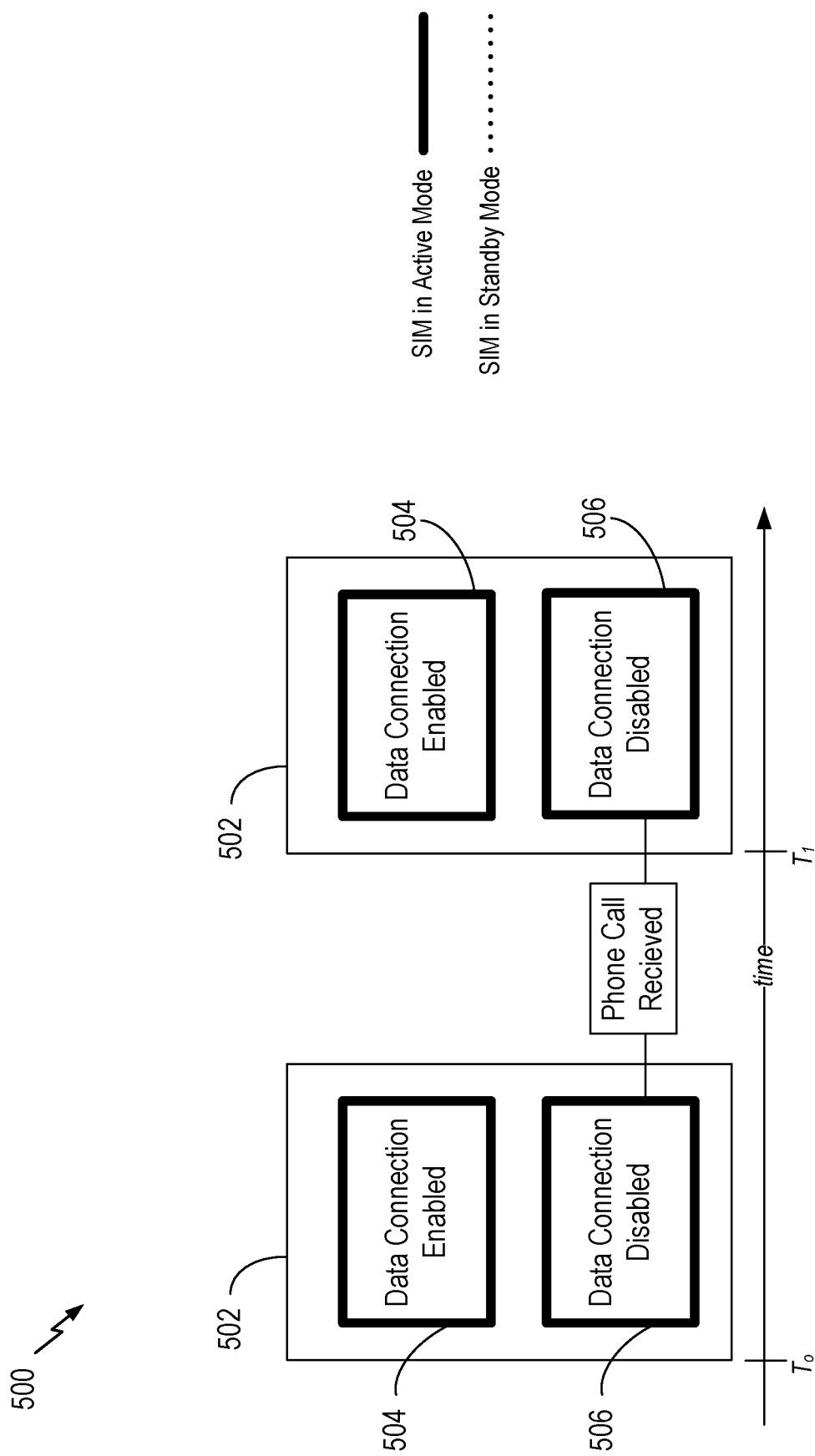
FIG. 5 depicts an example SIM selection in a dual SIM dual standby (DSDS) UE.

SIM preference resection based on receiving a voice call is not applicable to a dual SIM dual active (DSDA) multi-SIM UE. As illustrated in FIG. 5, when a traditional DSDA UE is in a first state 502, the DSDA UE places both a first SIM 504 and a second SIM 506 in active mode. If a user or the DSDA UE enables data connection on an active first SIM 504, and disables data connection on an active second SIM 506, the DSDA may remain in the first state 502 when the UE receives a voice call, and the user accepts the call at time $T_1$ because both SIMs are active and able to receive voice calls in the first state.

Example Method

FIG. 6 illustrates example operations 600 for wireless communications by a multi-SIM user equipment (UE), in accordance with some aspects of the present disclosure. For example, a multi-SIM UE 104 of FIG. 1 may perform the example operations 600.

At 610, the multi-SIM UE receives a set of preconfigured user preferences. At 620, based, at least in part, on the set of preconfigured user preferences, the UE dynamically selects to communicate data using one of a first SIM or a second SIM of the multi-SIM UE. For example, based on the preconfigured user preferences, the multi-SIM UE may select to receive data transfer from a first SIM that is designated for business purposes while a UE is at a user's business location. In another example, a multi-SIM UE may dynamically select to receive data transfer on a SIM designated for personal purposes based on some combination of an application use-type classification scheme, a UE location, and a time of day.

At 630, the multi-SIM UE receives the data transfer using the selected first SIM or second SIM. In one example, the multi-SIM UE may receive a data transfer on a SIM selected based on its receiving a voice call. In another example, data transfer may be restricted based on based on some combination of an application use-type classification scheme, a UE location, and a time of day.

Example Wireless Communication Devices

Figure 7:
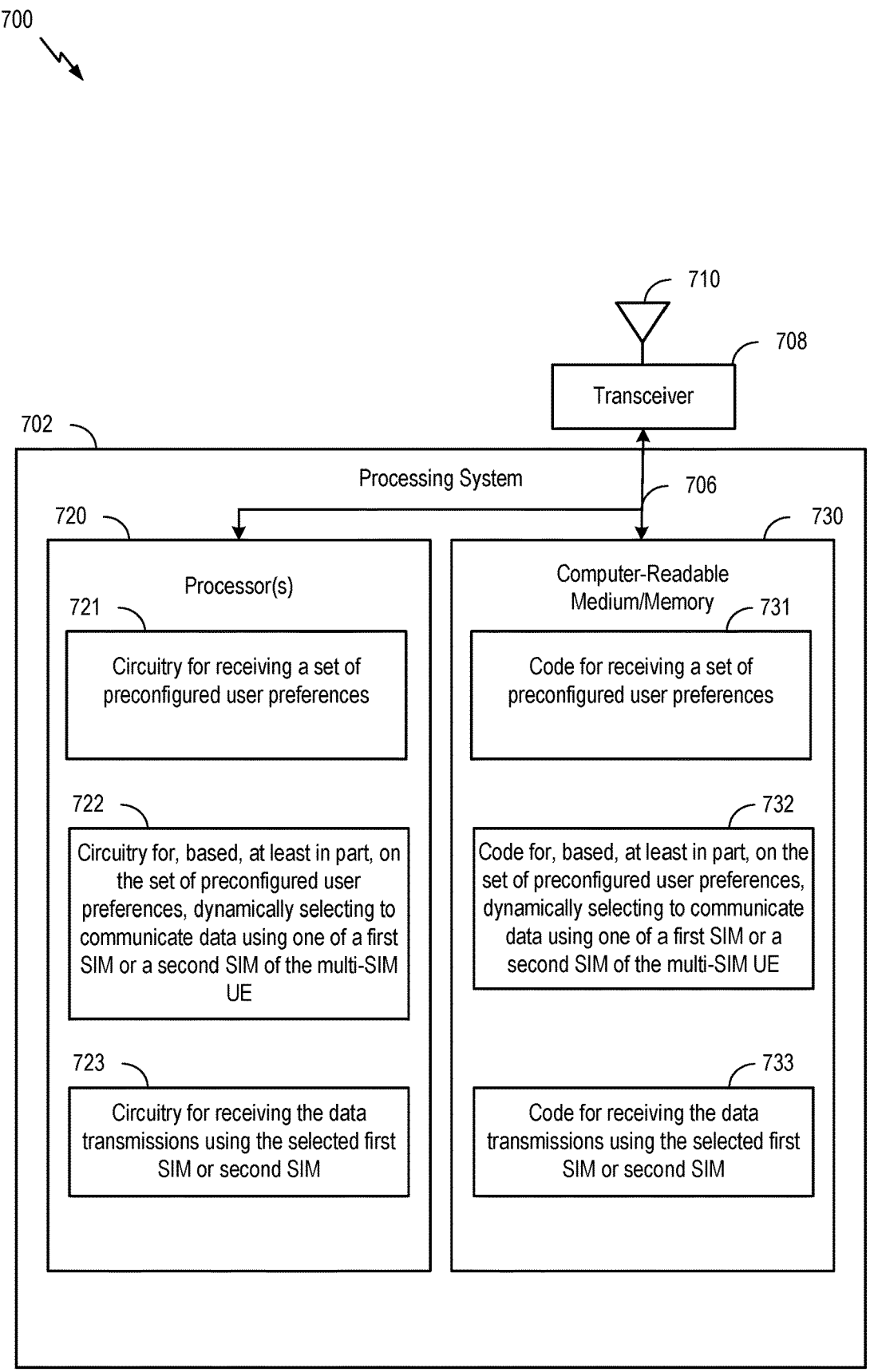
FIG. 7 illustrates a communications device that may include various components configured to perform operations of FIG. 6 in accordance with aspects of the present disclosure.

FIG. 7 depicts an example communications device 700 that includes various components operable, configured, or adapted to perform operations for the techniques disclosed herein, such as the operations depicted and described with respect to FIG. 6. In some examples, communication device 700 may be a base station 102 as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable medium/memory 730 via a bus 706. In certain aspects, computer-readable medium/memory 730 is configured to store instructions (e.g., computer-executable code) that when executed by the one or more processors 720, cause the one or more processors 720 to perform the operations illustrated in FIG. 6, or other operations for performing the various techniques discussed herein for selecting a SIM to receive data transfer.

In the depicted example, computer-readable medium/memory 730 stores code 731 for receiving a set of preconfigured user preferences, code 732 for based, at least in part, on the set of preconfigured user preferences, dynamically selecting to communicate data using one of a first SIM or a second SIM of the multi-SIM UE, and code 733 for receiving the data transfer using the selected first SIM or second SIM.

In the depicted example, the one or more processors 720 include circuitry configured to implement the code stored in the computer-readable medium/memory 730, including circuitry 721 for receiving a set of preconfigured user preferences, circuitry 722 for based, at least in part, the set of preconfigured user preferences, dynamically selecting to communicate data using one of a first SIM or a second SIM of the multi-SIM UE, and circuitry 723 for receiving the data transfer using the selected first SIM or second SIM.

Various components of communications device 700 may provide means for performing the methods described herein, including with respect to FIG. 6.

In some examples, means for transmitting or sending (or means for outputting for transmission) may include the transceivers 232 and/or antenna(s) 234 of the base station 102 illustrated in FIG. 2 and/or transceiver 708 and antenna 710 of the communication device 700 in FIG. 7.

In some examples, means for receiving (or means for obtaining) may include the transceivers 232 and/or antenna(s) 234 of the base station illustrated in FIG. 2 and/or transceiver 708 and antenna 710 of the communication device 700 in FIG. 7.

In some examples, means for selecting and receiving may include various processing system components, such as: the one or more processors 720 in FIG. 7, or aspects of the base station 102 depicted in FIG. 2, including receive processor 238, transmit processor 220, TX MIMO processor 230, and/or controller/processor 240 (including a multi-SIM manager component 241).

Notably, FIG. 7 is an example, and many other examples and configurations of communication device 700 are possible.

Example Clauses

Implementation examples are described in the following numbered clauses:

Clause 1: A method for wireless communications by a multi-subscriber identity module (multi-SIM) user equipment (UE), comprising receiving a set of preconfigured user preferences, based on, at least in part, the set of preconfigured user preferences, dynamically selecting to communicate data using one of a first SIM or a second SIM of the multi-SIM UE, and receiving a data transfer using the selected first SIM or second SIM.

Clause 2: The method of Clause 1, wherein the set of preconfigured user preferences indicate which of the first SIM or the second SIM to enable to receive the data transfer based on any combination of a current location of the multi-SIM UE, a time of day, or a classification of an application receiving the data transfer.

Clause 3: The method of any one of Clauses 1-2, wherein the dynamically selecting is based, at least in part, on historical data usage statistics of the multi-SIM UE.

Clause 4: The method of any one of Clauses 1-3, further comprising: limiting data transfers of selected applications based on the historical data usage statistics.

Clause 5: The method of any one of Clauses 1-4, wherein the dynamically selecting to receive the data transfer using one of the first SIM or the second SIM is further based, at least in part, on an output of a machine learning algorithm.

Clause 6: The method of any one of Clauses 1-5, wherein the dynamically selecting comprises selecting to receive the data transfer using a same SIM as an active voice call.

Clause 7: The method of any one of Clauses 1-6, wherein: the active call is received using the first SIM, and the dynamically selecting further comprises halting the data transfer on the second SIM.

Clause 8: The method of any one of Clauses 1-7, wherein the multi-SIM UE comprises a dual SIM dual standby (DSDS) UE.

Clause 9: An apparatus, comprising: a memory comprising executable instructions; one or more processors configured to execute the executable instructions and cause the apparatus to perform a method in accordance with any one of Clauses 1-8.

Clause 10: An apparatus, comprising means for performing a method in accordance with any one of Clauses 1-8.

Clause 11: A non-transitory computer-readable medium comprising executable instructions that, when executed by one or more processors of an apparatus, cause the apparatus to perform a method in accordance with any one of Clauses 1-8.

Clause 12: A computer program product embodied on a computer-readable storage medium comprising code for performing a method in accordance with any one of Clauses 1-8.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

ADDITIONAL CONSIDERATIONS

The preceding description provides examples of dynamically selecting a subscriber identity module (SIM) for data transfer in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a multi-subscriber identity module (multi-SIM) user equipment (UE), the method comprising:
   receiving a set of preconfigured user preferences associated with a first use purpose of a first SIM of the multi-SIM UE and a second use purpose of a second SIM of the multi-SIM UE;
   detecting one or more conditions associated with the set of preconfigured user preferences, wherein the one or more conditions associated with the set of preconfigured user preferences comprise at least one of: a time of day or a classification of an application receiving the data transfer;

determining, based on the one or more detected conditions, whether a data transfer is associated with the first use purpose of the first SIM or the second use purpose of the second SIM;

based, at least in part, on the determination, dynamically selecting to perform the data transfer using one of the first SIM or the second SIM; and performing the data transfer using the selected first SIM or second SIM.

2. The method of claim 1, wherein the one or more conditions associated with the set of preconfigured user preferences further comprise a current location of the multi-SIM UE.

3. The method of claim 1, wherein the dynamically selecting is based, at least in part, on historical data usage statistics of the multi-SIM UE associating the one or more conditions with the set of preconfigured user preferences.

4. The method of claim 3, further comprising limiting data transfers of one or more applications based on the historical data usage statistics.

5. The method of claim 1, wherein the dynamically selecting to perform the data transfer using one of the first SIM or the second SIM is further based, at least in part, on an output of a machine learning algorithm.

6. The method of claim 1, wherein the dynamically selecting to perform the data transfer using one of the first SIM or the second SIM comprises selecting to perform the data transfer using a same SIM as an active voice call.

7. The method of claim 6, further comprising halting data transfer on the other one of the first SIM or the second SIM.

8. The method of claim 6, wherein the multi-SIM UE comprises a dual SIM dual standby (DSDS) UE.

9. An apparatus for wireless communications, the apparatus comprising:

one or more processors; and a memory coupled to the one or more processors, the memory comprising code executable by the one or more processors individually or collectively to cause the apparatus to:

receive a set of preconfigured user preferences associated with a first use purpose of a first subscriber identity module (SIM) of the apparatus and a second use purpose of a second SIM of the apparatus;

detect one or more conditions associated with the set of preconfigured user preferences, wherein the one or more conditions associated with the set of preconfigured user preferences comprise at least one of: a time of day or a classification of an application receiving the data transfer;

determine, based on the one or more detected conditions, whether a data transfer is associated with the first use purpose of the first SIM or the second use purpose of the second SIM;

based, at least in part, on the determination, dynamically select to perform the data transfer using one of the first SIM or the second SIM; and perform the data transfer using the selected first SIM or second SIM.

10. The apparatus of claim 9, wherein the one or more conditions associated with the set of preconfigured user preferences further comprise of a current location of the apparatus.

11. The apparatus of claim 9, wherein the one or more processors are configured to cause the apparatus to dynamically select to perform the data transfer using one of the first SIM or the second SIM based, at least in part, on historical data usage statistics of the apparatus associating the one or more conditions with the set of preconfigured user preferences.

12. The apparatus of claim 11, wherein the one or more processors are configured to further cause the apparatus to limit data transfers of one or more applications based on the historical data usage statistics.

13. The apparatus of claim 9, wherein the one or more processors are configured to cause the apparatus to dynamically select to perform the data transfer using one of the first SIM or the second SIM further based, at least in part, on an output of a machine learning algorithm.

14. The apparatus of claim 9, wherein the one or more processors are configured to cause the apparatus to dynamically select to perform the data transfer using a same SIM as an active voice call.

15. The apparatus of claim 14, wherein the one or more processors are configured to further cause the apparatus to halt the data transfer on the other one of the first SIM or the second SIM.

16. The apparatus of claim 14, wherein the apparatus comprises a dual SIM dual standby (DSDS) user equipment.

17. An apparatus for wireless communications, the apparatus comprising:

means for receiving a set of preconfigured user preferences associated with a first use purpose of a first subscriber identity module (SIM) of the apparatus and a second use purpose of a second SIM of the apparatus;

means for detecting one or more conditions associated with the set of preconfigured user preferences, wherein the one or more conditions associated with the set of preconfigured user preferences comprise at least one of: a time of day or a classification of an application receiving the data transfer;

means for determining, based on the one or more detected conditions, whether a data transfer is associated with the first use purpose of the first SIM or the second use purpose of the second SIM;

means for, based, at least in part, the determination, dynamically select to perform the data transfer using one of the first SIM or the second SIM; and means for performing the data transfer using the selected first SIM or second SIM.

18. The apparatus of claim 17, wherein the one or more conditions associated with the set of preconfigured user preferences further comprise a current location of the apparatus.

19. The apparatus of claim 17, wherein the means for dynamically selecting to perform the data transfer using one of the first SIM or the second SIM comprises means for dynamically selecting to perform the data transfer using one of the first SIM or the second SIM based, at least in part, on historical data usage statistics of the apparatus associating the one or more conditions with the set of preconfigured user preferences.

20. The apparatus of claim 19, further comprising means for limiting data transfers of one or more applications based on the historical data usage statistics.

21. The apparatus of claim 17, wherein the means for dynamically selecting to perform the data transfer using one of the first SIM or the second SIM comprises means for dynamically selecting to perform the data transfer using one of the first SIM or the second SIM based, at least in part, on an output of a machine learning algorithm.

22. The apparatus of claim 17, wherein the means for dynamically selecting to perform the data transfer using one of the first SIM or the second SIM comprises means for dynamically selecting to perform the data transfer using a same SIM as an active voice call.

23. The apparatus of claim 22, further comprising means for halting the data transfer on the other one of the first SIM or the second SIM.

24. The apparatus of claim 22, wherein the apparatus comprises a dual SIM dual standby (DSDS) user equipment (UE).

25. A non-transitory computer readable medium having computer executable code stored thereon for wireless communications by a multi-subscriber identity module (multi-SIM) user equipment (UE), the computer executable code comprising:
   code for receiving a set of preconfigured user preferences associated with a first use purpose of a first SIM of the multi-SIM UE and a second use purpose of a second SIM of the multi-SIM UE;
   code for detecting one or more conditions associated with the set of preconfigured user preferences, wherein the one or more conditions associated with the set of preconfigured user preferences comprise at least one of: a time of day or a classification of an application receiving the data transfer;
   code for determining, based on the one or more detected conditions, whether a data transfer is associated with the first use purpose of the first SIM or the second use purpose of the second SIM;
   code for, based, at least in part, on the determination, dynamically selecting to perform the data transfer using one of the first SIM or the second SIM; and
   code for performing the data transfer using the selected first SIM or second SIM.

26. The non-transitory computer readable medium of claim 25, wherein the one or more conditions associated with the set of preconfigured user preferences comprise a current location of the multi-SIM UE.

27. The non-transitory computer readable medium of claim 25, wherein the code for dynamically selecting to perform the data transfer using one of the first SIM or the second SIM comprises code for dynamically selecting to perform the data transfer using one of the first SIM or the second SIM based, at least in part, on historical data usage statistics of the multi-SIM UE associating the one or more conditions with the set of preconfigured user preferences.

28. The non-transitory computer readable medium of claim 27, further comprising code for limiting data transfers of one or more applications based on the historical data usage statistics.

29. The non-transitory computer readable medium of claim 25, wherein the code for dynamically selecting to perform the data transfer using one of the first SIM or the second SIM comprises code for dynamically selecting to perform the data transfer using one of the first SIM or the second SIM further based, at least in part, on an output of a machine learning algorithm.

30. The non-transitory computer readable medium of claim 25, wherein the code for dynamically selecting to perform the data transfer using one of the first SIM or the second SIM comprises code for dynamically selecting to perform the data transfer using a same SIM as an active voice call.

* * * * *